United States Patent [19]
Berenda et al.

[11] Patent Number: 5,512,788
[45] Date of Patent: Apr. 30, 1996

[54] EXHAUST AIR RECOVERY SYSTEM

[76] Inventors: Robert M. Berenda, 4233 Haut Brion Ct., Allison Park, Pa. 15101; Jack Ferenci, R.D. #1, Box 248A, Grindstone, Pa. 15442

[21] Appl. No.: 304,371

[22] Filed: Sep. 12, 1994

[51] Int. Cl.[6] .............................. F03D 9/00; H02P 9/04; F02C 6/00
[52] U.S. Cl. .............................. 290/55; 290/54; 290/4 R
[58] Field of Search ...................... 290/1 R, 55; 415/2.1; 416/DIG. 9

[56] References Cited

U.S. PATENT DOCUMENTS

| | | | |
|---|---|---|---|
| 695,524 | 3/1902 | Woodell | 290/55 |
| 1,013,798 | 1/1912 | Messina | 290/55 |
| 1,876,595 | 9/1932 | Beldimano | 290/44 |
| 2,004,853 | 6/1935 | Crary | 290/55 |
| 3,070,703 | 12/1962 | Podolny | 290/2 |
| 3,152,260 | 10/1964 | Cummings | 290/1 R |
| 3,720,840 | 3/1973 | Gregg | 290/55 |
| 3,936,652 | 2/1976 | Levine | 290/2 |
| 4,087,196 | 5/1978 | Kronmiller | 415/2 |
| 4,087,927 | 5/1978 | Basmajian | 35/13 |
| 4,154,556 | 5/1979 | Webster | 415/2 |
| 4,159,426 | 6/1979 | Staton | 290/44 |
| 4,220,870 | 9/1980 | Kelly | 290/55 |
| 5,007,241 | 4/1991 | Saitou | 60/698 |
| 5,272,378 | 12/1993 | Wither | 290/1 R |

OTHER PUBLICATIONS

Wind Energy for Sustainable Development Booklet by American Wind energy Association, Sep. 1992.

*Primary Examiner*—Clayton E. LaBalle
*Assistant Examiner*—Christopher Cuneo
*Attorney, Agent, or Firm*—Buchanan Ingersoll; Robert J. Pugh

[57] ABSTRACT

A system which utilizes wasted or exhausted air flow from one or more ventilation systems of a bounded area such as a mine, a tunnel or some other area requiring ventilation. The exhaust fan of the ventilation system expels air causing air velocities to be directed out of the bounded area at one or more locations. The exhaust air from these necessary ventilation systems is captured and converted to electrical energy by existing wind-powered electrical energy generating equipment suitably positioned in front of the exhaust fan.

13 Claims, 3 Drawing Sheets

EXHAUST AIR RECOVERY SYSTEM

BACKGROUND OF THE INVENTION

1. Field of the Invention

This invention relates generally to utilizing moving air as a motive force for generating electric power. More particularly, this invention relates to the utilization of exhaust air flow from one or more ventilation fans which drive windmill type devices having electric power generating means.

2. Description of the Prior Art

Air flow is one of the oldest sources of energy used by man, but even today it is even the least researched suppliers of energy. Moving air in the form of wind has been used as a source of energy to power ships since ancient times. Windmills for purposes of pumping water, grinding corn and other such applications as paper mills and hammer mills date back at least as far as 200 B.C. in Persia. More recently, windmills have been used as a source for generating electrical energy.

The great advantage of wind driven power stations is their environmental friendliness. A wind utilizing power station consumes no raw materials nor does it give off waste gases or waste materials. Furthermore, wind utilizing power devices also produce very little noise in their operation.

Wind utilizing devices of the type having a turbine are known in the industry. Such turbines have blades or vanes attached to a rotatable shaft in which the vanes are driven by the wind and the shaft is coupled to an electric power generating means. These devices are generally referred to as windmills. Such a windmill is described in U.S. Pat. No. 2,004,853 to Crary.

Some such windmills have been specially adapted in an attempt to increase electrical output such as is shown in U.S. Pat. No. 3,720,840 to Gregg. These adoptions include making the position of fluid inlet adjustable so as to be oriented in the direction of the maximum gas flow. Another adaption taught by Gregg includes utilizing a heating unit to increase fluid flow through the device.

Also, attempts have been made to utilize secondary air currents in connection with windmill type devices in order to generate power. For example, in U.S. Pat. No. 3,936,652 to Levine, air inlet ducts of a power plant such as an atomic reactor, a fossil fuel plant, a solar collector or a geothermal heat supply. Thus, as heat flows out of the vertical tower, air is sucked into inlet ducts connected to the cooling tower. As air is sucked into the inlet ducts, it turns the windmill devices provided in such inlet ducts. Similarly, U.S. Pat. No. 1,013,798 to Messina also utilizes inlet air flow of a vertical tower having a heat source disposed therein to drive a windmill type energy generating device.

In each of the above-referenced devices, general wind flow or secondary intake air is captured and converted to energy. None of the cited references disclose capturing exhaust air from air flow producing devices which perform necessary functions.

SUMMARY OF THE INVENTION

We provide a system which utilizes wasted or exhausted air flow from one or more ventilation systems of a defined area. The system utilizes windmill type wind powered energy conversion devices, generally referred to as "turbine". Thus, the windmill is located at some distance from the ventilation fan, downstream of the ventilation fan.

Ventilation fans are necessary in industries such as the mining and tunneling industries and are also often incorporated in connection with telecommunication and various utility tunnels (i.e., water, sewer, transportation, etc.). In each of these industries, mechanical ventilation systems are normally maintained. Thus, whether the defined area is a mine, a tunnel or some other area, a ventilation fan may be employed to expel air causing air velocities to be directed out of the defined area at a selected exhaust location or locations.

Through the proposed invention, the exhaust air from these necessary ventilation systems may be captured and converted to electrical energy. The electrical energy derived from such ventilation air flow may be used to reduce the outside electrical energy requirements of operating the ventilation device, thus reducing the overall fixed cost of operating the ventilation device. In addition to offsetting power costs, the system is capable of cogenerating electric energy to a power grid for use on site, or for supplemental use on a power distribution or power transmission system.

Thus, exhaust air expelled from a necessary ventilation system which has heretofore been wasted may be recovered and converted to electrical energy. Moreover, existing wind powered electrical energy generating equipment is modified so as to maximize exhaust air recovery performance.

Other objects and advantages of the invention will become apparent from a description of certain present preferred embodiments thereof shown in the drawings.

DETAILED DESCRIPTION OF THE PREFERRED EMBODIMENTS

Figure 1B:
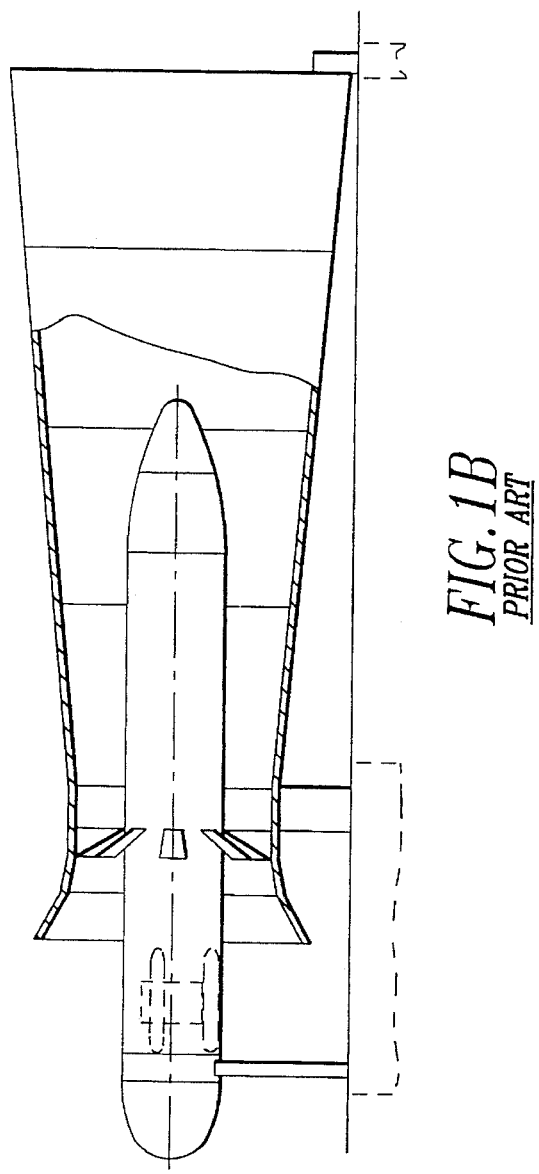
FIG. 1B is a side elevational view of a prior art exhaust fan.
Figure 1A:
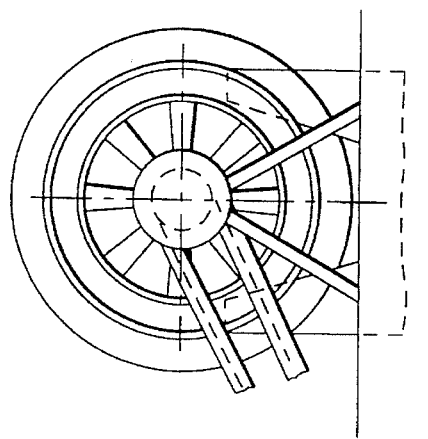
FIG. 1A is a front elevational view of a prior art exhaust fan.

In certain bounded areas in which there is little or no natural replenishing of the fresh air supply or in which potentially harmful gasses are vapors may accumulate, such as mines, tunnels and certain factories, ventilation systems are typically employed to replenish the fresh air supply. Such ventilation systems typically include ventilation or exhaust fans which open to ambient air. A typical such prior art exhaust fan is shown in FIGS. 1A and 1B. As can be seen in the figures, exhaust fans have a wind tunnel-like body, having an intake end and an opposed discharge end. The flow of air through the fan during exhaust operation is from the intake end and through the discharge end. Thus, air flow is drawn into the intake end and is expelled out of the discharge end. For exhaust operation, the intake end is provided within and typically connected to the containing structure of the defined area. The discharge end opens to ambient air at an exhaust location outside of the bounded area.

The length and pitch of the exhaust fan blades, the horsepower of the motor driving the exhaust fan and the dimensions of the exhaust fan, particularly the diameter, are each design factors which determine the volume of air flow that the exhaust fan delivers. Different applications require varying air flow volumes, but most industrial applications require between 50,000 and 1,000,000 cubic feet per minute (CFM).

Figure 2:
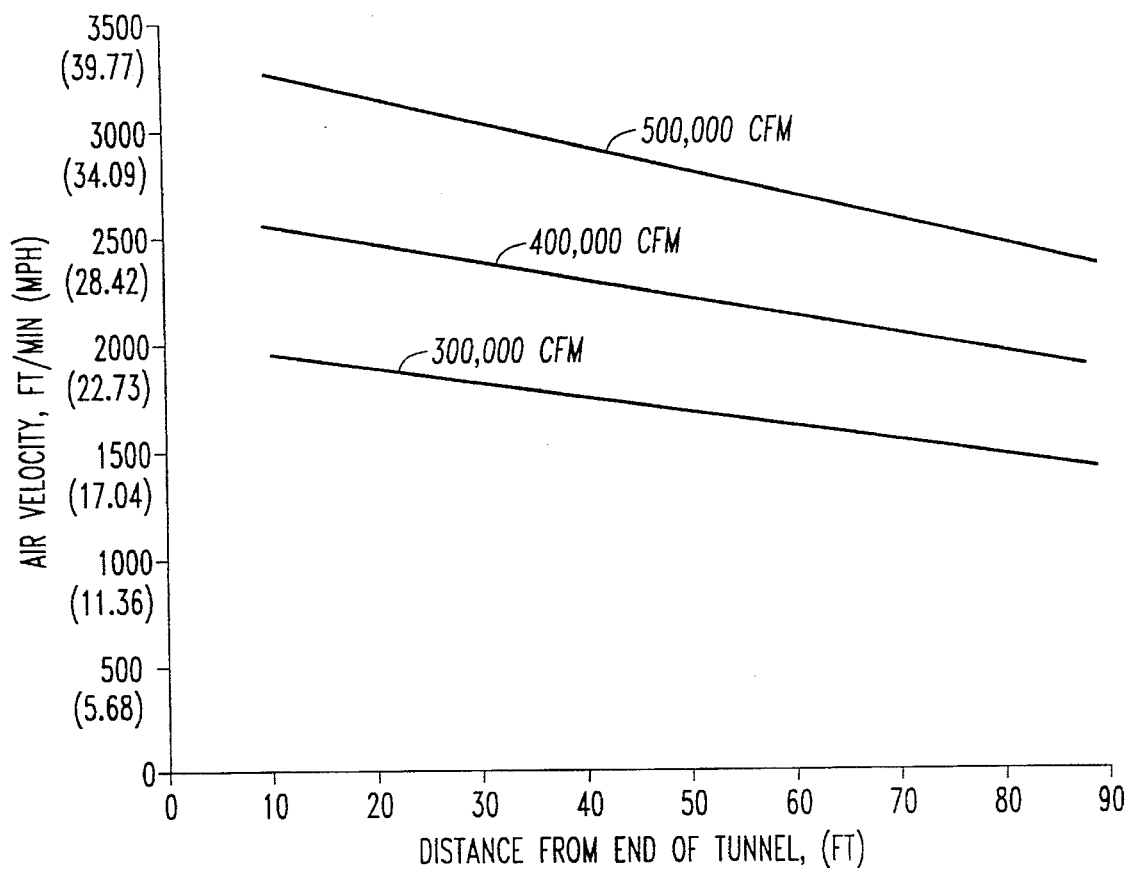
FIG. 2 is a graphic plot of the exit air velocity from an exhaust fan versus the distance from the exhaust fan.

The velocity of the air expelled from the discharge end of the exhaust fan will vary depending on the air flow volume delivered by the fan as well as by the distance from the discharge end of the fan. Referring next to FIG. 2, a plot is shown which graphically shows the air velocity at varying distances from the discharge end of a standard Jeffrey™ 8H96 exhaust fan powered by a 425 hp motor moving 300,000 CFM of air. Plots are also provided on FIG. 2 for 400,000 CFM and 500,000 CFM using extrapolated values from fan curves and standard velocity calculations. As can be seen in FIG. 2, the velocity profile curves for the respective CFMs are generally linear, with the highest values obtained the closest to the fan discharge end. The plots of FIG. 2 provide air velocities at distances beginning at 10 feet from the exhaust end of the exhaust fan. This is because safety doors typically require 10 feet of clearance from the fan exhaust end.

Figure 3:
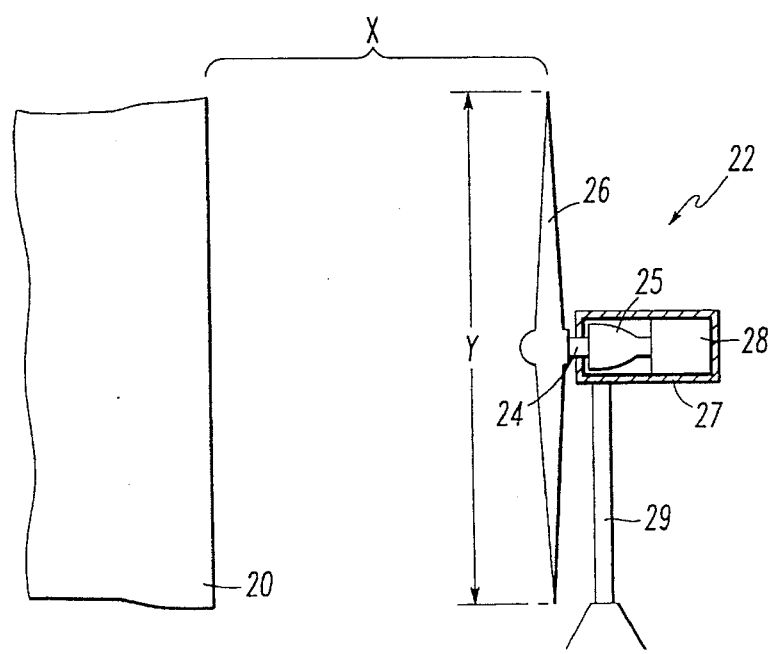
FIG. 3 is a side elevational view of a preferred windmill.

Referring next to FIG. 3, a windmill is shown. The windmill 22 has a rotor which is a number of blades 26 or veins mounted to a rotatable shaft 24. Typical commercial windmills utilize two or three blades. The rotatable shaft 24 is coupled to a gearbox 25 which in turn is coupled to an electric generator 28. The rotatable shaft 24, gearbox 25 and generator 28 are usually mounted within a housing 27 that is positioned upon a tower 29. The rotatable shaft 24 is typically mounted perpendicular to the tower 29 and the blades 26 are in turn typically mounted perpendicular to the rotatable shaft 24. Therefore, the tower 29 has a minimum height that allows the rotor to freely turn without contacting the ground. The rotor diameter, labeled as "4" in FIG. 3, is typically 5 feet to 100 feet for commercial windmills. As can also be seen in FIG. 3, each windmill 22 is positioned a selected distance, designated as "X", from the exhaust end 20 of the exhaust fan 16. The minimum value of distance X that a windmill 22 may be placed from the exhaust fan 16 is ten (10) feet due to the safety doors (see FIG. 2). The maximum value of distance X that a windmill may be placed from the exhaust fan depends on the flow volume delivered by the fan. The greater the fan flow volume, the larger the maximum distance a fan may be placed from the exhaust fan.

As wind is directed towards the rotors of the windmill, the rotors act as an airfoil and are turned by the moving air. The rotor blades cause the rotating shaft to turn through the gearbox and to allow electrical energy to be generated at the generator. The electrical power output of a wind electric conversion system is dependent upon the velocity of the moving air acting on the windmill rotors. Generally, a commercially available windmill may generate between 5 and 500 KW at air velocities of between 20 and 40 mph. Further, the electrical power output of a wind electric conversion system is also dependent upon the size and pitch of the rotor blades. The preferred range of sizes of each rotor blade is 3 feet to 50 feet, and the preferred range of pitches of the rotor blades will vary upon wind velocities and will change to maintain a constant rotor speed (variable pitch). Typical commercial windmills are variable pitch.

Figure 4:
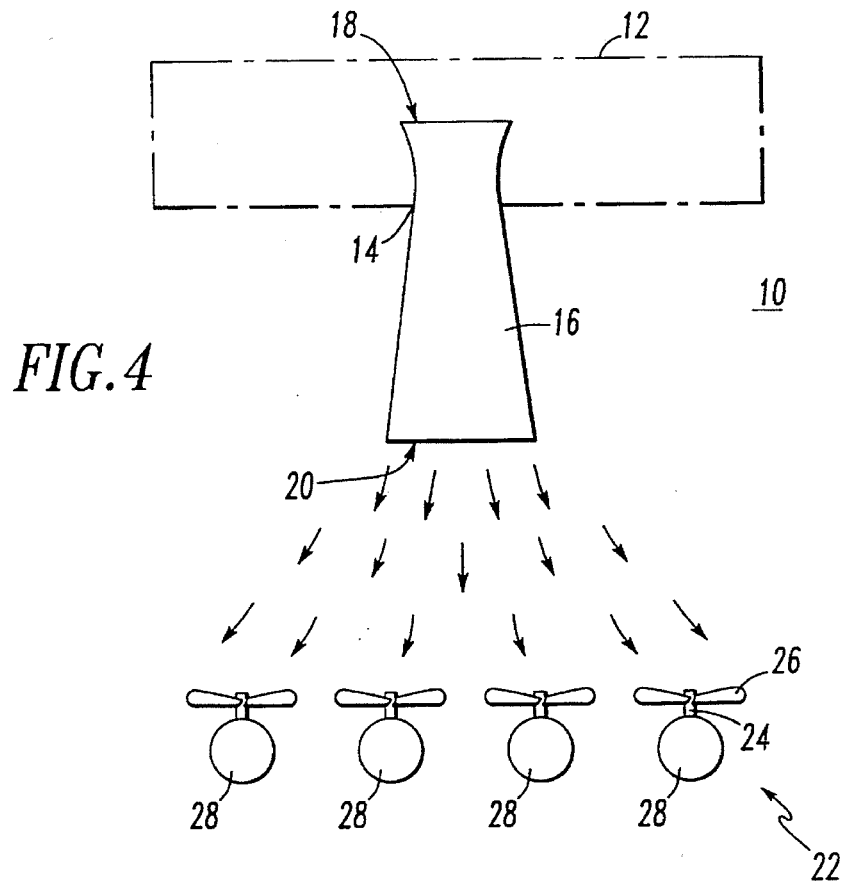
FIG. 4 is a schematic depiction of the present preferred energy recovery system.

Thus, a present preferred energy recovery system is described which utilizes the air velocities caused by exhaust fans of ventilation systems. Referring to FIG. 4, the energy recovery system is depicted. A bounded area 12 which, as noted herein, may be a mine, a tunnel, a factory or any other such space which requires ventilation is depicted in dashed line. The bounded area 12 has at least one location 14 which opens to ambient air.

Provided at each respective exhaust locations 14 is at least one exhaust fan 16. Exhaust fan 16 has an intake end 18 and an exhaust end 20 opening at opposed end thereof. The intake end 18 of the exhaust fan 16 is provided within the bounded area 12. The exhaust end 20 extends outward from the bounded area and opens to ambient air outside of bounded area 12. When the exhaust fan 16 is operating, air velocities are generated outward from the exhaust fan end 20. The air velocities are depicted in FIG. 4 at a series of arrows.

Facing the exhaust fan are one or more or a series of windmills 22. Windmills 22 are oriented and positioned so that the wind velocities exiting the exhaust fan 16 act upon the rotor blades 26 of windmills 22. The wind velocities turn blades 26 of the windmills causing rotatable shaft 24 of each such windmill to rotate. The rotatable shaft 24 rotates preferably through a gearbox (not shown in FIG. 4) so as to act on generator 28 such that electrical power is generated from generator 28.

Figure 5:
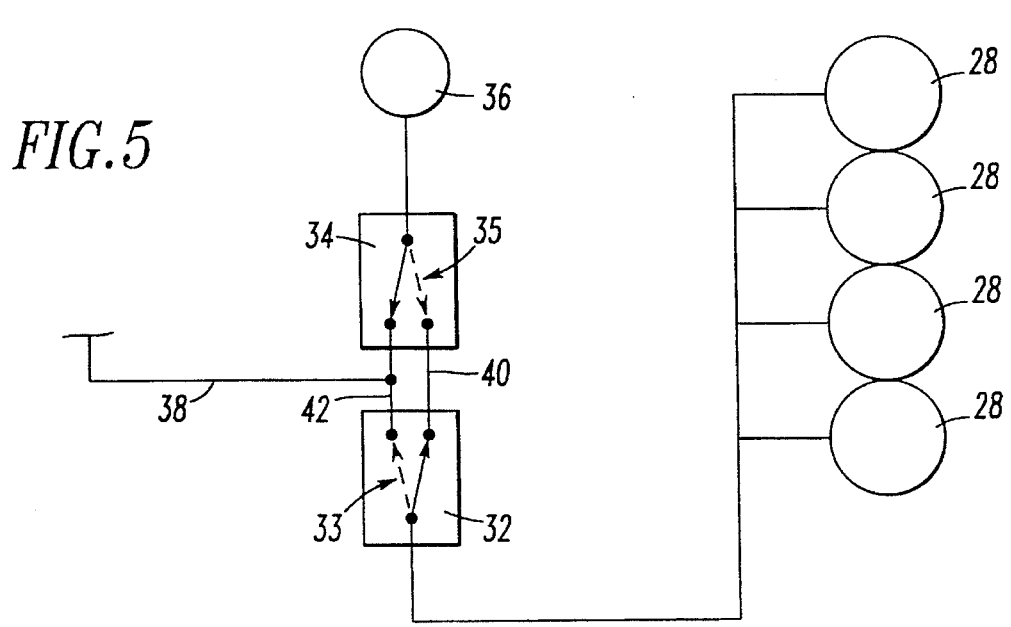
FIG. 5 is a diagrammatic depiction of the electrical wiring of the present preferred energy recovery system.

As can be seen in FIG. 5, the electrical wiring diagrammatic of the preferred energy recovery system is shown. Current flow of the electricity developed at the respective generators 28 preferably travels through wiring 30 into the generator control 32. Generator control 32 has switching means 33 provided therein. Depending upon the position of the switching means 33 of exhaust generator control 32, the electrical current may travel to the fan motor control 34 of a motor 36 or may alternately travel to a power line 38. Similarly, the motor 36 is electrically connected to a motor controller 34. Motor controller 34 also has switching means 35 provided therein. Depending upon the position of the switching means 35, in cooperation with switching means 33, the motor 36 may be powered by current from the power line 38 or by the current developed at the generators 28.

Thus, when the switching means 33 of exhaust generator controller 32 is in the position shown in FIG. 5, current may travel line 40. However, current from the generators 28 will not travel to the motor 36 from line 40 when the switching means 35 of the motor controller 34 is in the position shown in FIG. 5. When the switching means is in such position, current from the power line 38 travels through line 42 to the motor 36. Under these conditions, an electrical connection (not shown) may be made to line 40 to some other electrical load or to the power line. Thus, the system is capable of cogenerating electrical energy for use on site.

As noted above, when the switching means 33 of exhaust generator controller 32 is in the position shown in FIG. 5, current may travel into line 40. When switching means 35 of motor controller 34 is in the position indicated by the dotted arrow in FIG. 5, the current developed at the generators 28 will flow directly through line 40 into motor 36. Thus, under these conditions, assuming that an adequate number of generators 28 are being utilized, no electrical input is required from power line 38.

Furthermore, when the switching means 33 of the generator controller 32 is in the position indicated by the dotted arrow in FIG. 5, current developed at the generators 28 may travel into line 42. Then, when the switching means 35 of the motor controller 34 is in the position shown in FIG. 5, current from the generators 28 may effectively reduce the current required to supply the motor 36 from power line 38. Thus, the electrical energy derived from the necessary ventilation exhaust air flow may be used to reduce the outside electrical energy requirements of operating the ventilation system.

Variations of the preferred embodiments may be made. For example, although the ventilation systems have been shown as employing one exhaust fan at each exhaust location, two or more exhaust fans may instead be used at each exhaust location. Furthermore, any number of windmills may be utilized at each respective exhaust location. Also, although commercial windmills typically each have two or three rotor blades, any number of blades may be utilized with each windmill.

Also, although exhaust fans are described herein in which the range of air velocities between 10 feet and 90 feet of the fan exhaust end is between 20 and 40 mph, other exhaust fans having different performance characteristics may be utilized.

While certain present preferred embodiments have been shown and described, it is distinctly understood that the invention is not limited thereto but may be otherwise embodied within the scope of the following claims.

We claim:

1. An energy recovery system comprising:
   a ventilation system of a defined area, the ventilation system having at least one exhaust location, wherein air from within the defined area is expelled outward of the defined area by an exhaust fan as a directed air flow at the at least one exhaust location; and
   at least one windmill located exterior to the defined area and being spaced a selected distance from such at least one exhaust location, each such at least one windmill having:
   (i) a rotatable shaft;
   (ii) a plurality of vanes attached to said rotatable shaft; wherein the directed air from the ventilation system acts on said vanes, rotating said rotatable shaft; and
   (iii) an electrical generator connected to said rotatable shaft.

2. The energy recovery system of claim 1 wherein said defined area is a mine.

3. The energy recovery system of claim 1 wherein said defined area is a tunnel.

4. The energy recovery system of claim 1 wherein said at least one windmill is a plurality of windmills.

5. The energy recovery system of claim 4 wherein said plurality of windmills are arranged in an array.

6. The energy recovery system of claim 5 wherein each of said plurality of windmills has a rotor diameter of approximately 5 feet to 100 feet.

7. The energy recovery system of claim 6 wherein each such windmill is spaced a distance greater than 10 feet from an adjacent windmill.

8. The energy recovery system of claim 1 wherein said ventilation system is comprised of at least one exhaust fan operating at approximately 100,000 CFM.

9. The energy recovery system of claim 8 wherein each of said plurality of windmills has a rotor diameter of between approximately 5 and 140 feet.

10. The energy recovery system of claim 1 further comprising a feed from the electrical generator of each at least one windmill to an electrical system for supply of power to shift ventilation system.

11. The energy recovery system of claim 1 further comprising a feed for connecting electrical generator of each at least one windmill to a power system.

12. The energy recovery system of claim 10 further comprising a feed for connecting the electrical generator of each at least are windmill to a power system and means for selectably connecting the electrical generator to one of the power system feed and the ventilation electrical system feed.

13. An energy recovery system comprising:
   a ventilation system of a mine, the mine ventilation system having at least one exhaust location, wherein air from the mine is expelled at the at least one exhaust location; and
   a plurality of windmills located exterior to the mine and being spaced a selected distance from one another and from such at least one exhaust location, each such at least one windmill having:
   (i) a rotatable shaft;
   (ii) a plurality of vanes attached to said rotatable shaft wherein the expelled air from the mine ventilation system acts on said vanes, said rotatable shaft; and
   (iii) an electrical generator connected to said rotatable shaft.

* * * * *